INVENTORS
ROBERT A. HENLE
WILBUR D. PRICER
BY
[signature]
ATTORNEY

United States Patent Office 3,449,728
Patented June 10, 1969

3,449,728
FEEDBACK CURRENT SWITCH MEMORY ELEMENT

Robert A. Henle, Hyde Park, and Wilbur D. Pricer, Pleasant Valley, N.Y., assignors to International Business Machines Corporation, Armonk, N.Y., a corporation of New York
Filed Jan. 28, 1966, Ser. No. 523,614
Int. Cl. H03k 3/26
U.S. Cl. 340—173 13 Claims

ABSTRACT OF THE DISCLOSURE

A memory element which is simply constructed using only two transistors and having direct coupling from the collector of one transistor to the base of the other transistor. The memory elements or cells are arranged in a matrix and at least three lines are connected to each cell, the first line being a WORD line, connected to the first terminal, or collector, of one of the transistors in each of the memory cells corresponding to bit positions in a predetermined data word; the second line being a BIT line connected to a second terminal, or base, of said one of the transistors in each of the memory cells corresponding to the same bit position in different data words. Coincident, oppositely-directed, pulses are applied by way of the first and second lines in order to write a "1" into a predetermined cell within the array. At least one other line is also utilized for resetting the cells.

The memory cellls can also be arranged to provide a transistor shift register and utilizing the same coincident pulsing techniques for writing in information and with means for resetting so as to shift information within the register.

This invention relates to a memory or storage device and more particularly, to a transistor memory element and to a shift register in which said memory element is particularly adapted for use.

Computers and data processing machines in general require storage devices in large numbers, each of which is capable of storing a "bit" of digital information, that is, a zero or a one. Many different devices have been proposed for the storage of digital information and one of the most popular of these devices is the magnetic core, which stores information by means of the remanent magnetic states thereof. Another device which has also been considered for memory applications is the tunnel diode which is a two-terminal semiconductor device exhibiting in its voltage current characteristic, two distinct positive resistance regions separated by a negative resistance region. This device is capable, in and of itself, because of the aforesaid characteristic, of providing two distinct stable states.

The conventional junction transistor, which is a device well-known in the art, has been used extensively in various types of electronic circuits because of its advantages of small size, low power losses, sturdiness, etc. The conventional junction transistor, however, does not provide distinct stable states when connected alone in a simple circuit, and it becomes necessary to use pairs of such transistors and regenerative feedback means to achieve the requisite stable states. For these reasons, as well as others, transistors have not heretofore been found to be cheap enough, in terms of cost per bit of information to be stored, to be adapted to large scale memory systems and to such devices as shift registers.

In order to provide a transistor memory that will compete economically and will approach the speed capabilities of other devices, it must be possible to fabricate transistor memory elements to achieve great packing density on the order of many thousands of such memory elements per square inch. However, it is not simply a question of packing great numbers of these memory elements in a given volume, since there arises the matter of the interconnections to the many thousands of such devices. Internal circuitry must be simple enough so as not to limit the inherent gains possible with the potential packing density.

The present invention provides a memory or stage element uniquely adapted to be fabricated in monolithic form. By monolithic is meant that type of integrated semiconductor circuitry wherein the required vast numbers of devices are all contained in a block or monolith of semiconductor material. Such assemblies of devices are conventionally achieved today by the diffusion technology which can be advantageously directed to the formation of a plurality of discrete active devices by a sequence of masked diffusion steps. By means of various techniques the individual devices are isolated from each other within the monolith. Interconnection patterns which allow for connecting a plurality of devices in suitable electrical circuit configurations are normally provided on the top surface of the semiconductor monolith.

It is a primary object of the present invention to provide an extremely simple memory element readily implemented by monolithic techniques of semiconductor device fabrication.

Another object is to provide a memory element which in operation requires the use of only monopolar pulse from a variable bias source.

A further object is to provide a memory element capable of high-speed operations on the order of tens of nanoseconds.

Yet another object is to provide a memory element from which information may be read out nondestructively.

Still another object is to provide a memory matrix constituted of simple memory elements or cells.

The memory element of the present invention is simply constructed using only two transistors and employing direct coupling from the collector of one transistor to the base of the other transistor. The term "direct coupled" when used with respect to transistor circuitry refers to the fact that there is no impedance element, such as resistance or capacitance, present in the coupling link or connection from one point to the other.

In accordance with a primary feature of the present invention, a plurality of memory elements as described above are connected in a matrix. A plurality of lines are connected to each of the memory cells and pulse sources are connected to the respective lines in order to write information into the cells and to reset the cells. In particular, for writing in a "1," pulses are applied coincidently to the word and bit lines, the word line being connected to the collector of one of the transistors in each of the memory cells corresponding to a data word and the bit line being connected to the base of the said one of the transistors in each of the memory cells corresponding to the same bit position in different data words.

In accordance with another feature of the present invention, a plurality of the aforesaid memory elements are connected to provide what is known in the art as a shift register. Briefly, the operation of such a shift register involves the writing in or feeding to the shift register of a train or a series of pulses at an input point to a plurality of register stages and the shifting through these stages of the train or series of pulses toward an output point. The shifting is accomplished by periodically recurring pulses.

Accordingly, it is also a primary object of the present invention to provide a transistor shift register, and specifically, a transistor shift register which uses the aforenoted extremely simple transistor memory elements as components in the register stages.

Because of the potentially low cost of monolithic integrated circuits, as alluded to above, the transistor shift register of the present invention takes advantage of this factor and avoids the generally undesirable use of reactive elements for energy storage by employing a double rank arrangement of shift cells or memory elements. Direct coupling is used between the shift cells of the shift register.

The novel features and the advantages of the present invention, both as to its organization and method of operation, will be best understood from the accompanying description taken in connection with the accompanying drawings, in which like characters refer to like parts, and in which.

Figure 1:
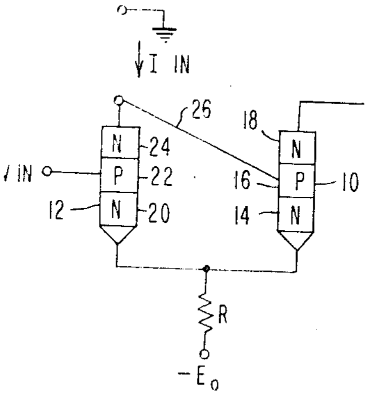
FIG. 1 is a schematic circuit diagram of a basic current switch.

Referring now to FIG. 1, the basic operation of a so-called current switch will first be considered as preliminary to an understanding of the present invention. In FIG. 1 a first transistor 10 and a second transistor 12 are provided, typically of the N-P-N type. It will be appreciated that the opposite polarity of transistor could have been selected, that is, a transistor of the P-N-P type. The former will be referred to as a positive polarity transistor and the latter as a negative polarity transistor. Each of the transistors 10 and 12 are provided with conventional emitter, base, and collector regions, designated 14, 16 and 18 respectively, for transistor 10, and 20, 22 and 24 for transistor 12. The base 16 of transistor 10 is coupled directly to the collector 24 of transistor 12 by means of lead 26. Normally, the collector 24 would be connected through a suitable load resistor to a bias and signal source. However, for the purpose of circuit analysis, the collector is shown open-circuited for reasons that will be apparent. The emitters 14 and 20 of the respective transistors 10 and 12 are coupled together and thence through a common emitter resistor $R_e$ to a source of negative bias $-E_0$.

Figure 2:
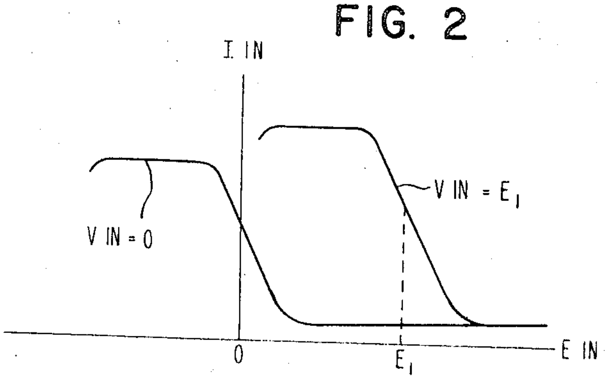
FIG. 2 is a V.I. characteristic for the current switch illustrated in FIG. 1.

The V.I. characteristic at the collector 24 of transistor 12 is as depicted in FIG. 2 for two values of $V_{in}$ applied to the base 22 of transistor 12. It can be seen that if the collector 24 of transistor 12 is at the base potential of transistor 12 ($V_{in}$) then the current through $R_e$ will divide between transistors 10 and 12. If the collector 24 is made approximately 0.2 volt more positive than the voltage $V_{in}$, transistor will conduct virtually all the current that flows through $R_e$ and the current seen at the collector of transistor 12 will be the base current of transistor 10. If the collector 24 of transistor 12 is made 0.2 volt more negative than $V_{in}$, then transistor 12 will conduct the current that flows through $R_e$, and hence the current seen at the collector of transistor 12 will be this current. As the collector of transistor 12 is brought even more negative than $V_{in}$, that is, by more than 0.2 volt, the current at the collector of transistor 12 remains constant until the collector saturation of transistor 12 is reached. This occurs when $E_{in}$ is approximately 0.6 volt more negative than $V_{in}$. At this point, the input current will start to decrease, as shown in FIG. 2, due to the conduction of transistor 10. If the input voltage is brought more positive than $V_{in}$ by 0.2 volt the current $I_{in}$ will increase as the base current of transistor 10 increases. The base current of transistor 10 increases because the increased based voltage causes an increased drop across resistor R. The current $I_{in}$ can be made to increase more sharply at a selected stage by permitting transistor 10 to saturate.

Figure 3:
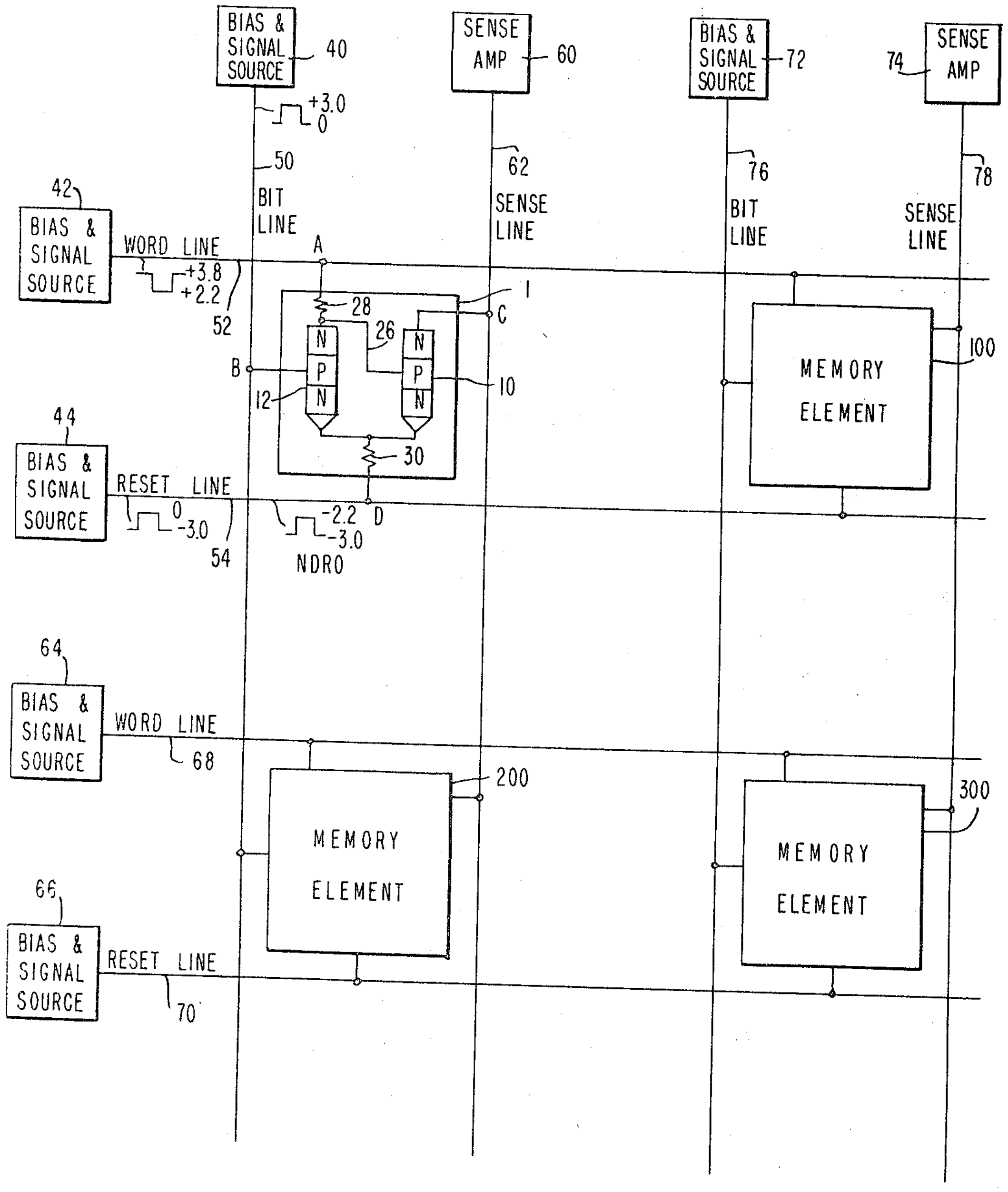
FIG. 3 is a schematic circuit diagram partly in block form of one embodiment of a memory element in accordance with the present invention shown connected in a matrix of identical elements.

Referring now to FIG. 3, a first memory cell configuration in accordance with the present invention is shown connected in a typical 2 x 2 matrix. The memory cell or element is shown in detail within a box, and the other boxes 100, 200 and 300 represent other identical memory elements. As in the circuit in FIG. 1, the transistors are designated as 10 and 12. Load resistor 28 is additionally shown connected to the collector of transistor 12. The common emitter resistor is designated as 30 in FIG. 3. Connections are shown from the collector of transistor 10 to a point C, from the collector of transistor 12 through the resistor 28 to point A, from the base of transistor 12 to point B and from emitters of transistors 10 and 12 through the common resistor 30 to point D. These same points, A, B, C and D of course are also applicable to the other memory elements in the array, that is, 100, 200 and 300.

The line to the point A and thence to the collector of transistor 12 and to the base of transistor 10, is referred to as the "word line." The line to the common emitter resistor 30 is referred to as the "reset line." The line to the point B and thence to the base of transistor 12 is referred to as the "bit line" and the line to point C and thence to the collector of transistor 10 is referred to as the sense line." It will be noted that bias and signal sources 40, 42 and 44 are connected respectively to the bit line 50, word line 52, and reset line 54. A sense amplifier 60 is connected to the sense line 62. The bias and signal sources 42 and 44 are likewise connected to the other bit positions in a typical data word and, in the example shown in FIG. 3, to the other bit position represented by memory element 100. Similarly, other bias and signal sources 64 and 66 are connected via word line 68 and reset line 70 respectively, to the memory elements 200 and 300 in the exemplary matrix, such memory elements representing different bits in another data word. Bias and signal source 40 is also connected to the point B of memory element 200 via bit line 50. Sense amplifier 60 is also connected to the appropriate point C of the memory element 200 via sense line 62.

In like fashion, bias and signal source 72 and sense amplifier 74 are connected via lines 76 and 78 to memory elements 100 and 300.

Considering now the operation of the circuit of FIG. 3, and, for the sake of simplicity, considering only memory cell 1, when the potential on the reset line is reduced sufficiently, this shuts off current to the transistors 10 and 12. When the potential is returned to its initial state and current is reapplied to the combination of transistors 10 and 12, only the transistor 10 will conduct. This is considered the "0" state. The "1" state is represented by conduction by transistor 12. In order to write a "1," a negative pulse is applied from bias and signal source 42 on the word line 52, and a positive pulse is applied coincidently from bias and signal source 40 on the bit line 50, causing the base of transistor 12 to become more positive than the base of transistor 10 and shifting the current to transistor 12. The parameters are chosen such that a pulse applied alone to either the bit line or the word line will not cause the preceding operation to occur. A set of typical values is shown in FIG. 3, adjacent cell 1.

It is highly desirable in memory systems that the memory elements or cells may be read out nondestructively, that is, in a manner which makes it possible to ascertain the state of the cells without requiring that the state be changed. Nondestructive read out of the memory cell 1 and, of all like cells in the array of FIG. 3 is accomplished, according to one technique of the present invention, by pulsing the word line negatively as for a normal word pulse. Thus, when such a pulse is applied to word line 52 from bias and signal source 42, if transistor 10 is conducting, the base of transistor 10 will go negative, causing a decrease in the emitter (and collector) current of transistor 10, and hence, a change in current will be detected by sense amplifier 60. Sense amplifier 60 is connected to the sense line 62, which in turn is connected via point C to the collector of transistor 10. However, if at the time of pulsing the word line negatively transistor 12 is conducting, no change will occur in the collector current of transistor 10 during this operation, and therefore no signal will appear on the sense line 62.

An alternative method of nondestructive read out that could also be employed would be to cause a variation in the potential of the reset line 54. Thus, the emitter current and collector current of transistor 10 would be changed but only if transistor 10 is conducting at the time of the nondestructive read out operation.

It will be obvious to those skilled in the art that in the circuit shown in FIG. 3, the memory cell 1, as well as the other memory cells 100, 200 and 300, can be read out destructively by the aforedescribed resetting of the individual cells by means of a pulse of sufficient magnitude applied to the reset line. Thus, a change of potential which is great enough to reset the cell will, in the event that transistor 12 was originally conductive, cause a change in current on the sense line, for example, sense line 62 in the case of memory cell 1.

Figure 4:
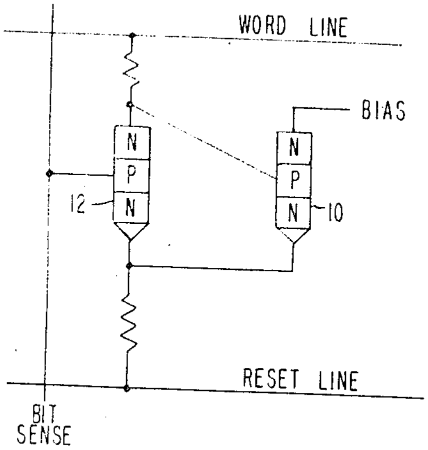
FIG. 4 is a schematic circuit diagram of an alternative embodiment of a memory element.

In an alternative embodiment of the memory element or cell of the present invention, the configuration illustrated in FIG. 4 may be advantageously utilized. In this configuration, contrasted with the memory cell 1 in FIG. 3, three dynamic or active lines are provided to the cell namely, a word line, a reset line, and a bit-sense line by which two previous functions are combined. In the configuration of FIG. 4 the operation of writing into the cell is precisely as described before. However, with the bit and sense line functions combined, transistor 12 when conducting is normally operated just out of saturation. Now a negative pulse is applied on the word line such as to cause transistor 12 to saturate and thereby to cause a change in the base current of transistor 12 with the concomitant effect that a signal is produced on the bit-sense line. This operation can also be brought about by pulsing the reset line such that the increase in emitter, and, therefore collector current, causes already conducting transistor 12 to saturate, thereby again resulting in a change in the base current of transistor 12. However, if at the time of pulsing the reset line transistor 10 is conducting, the base current of transistor 12 is unaffected and no signal results on the bit-sense line.

Although in the illustration of FIG. 4 the collector of transistor 10 is shown as returned to a fixed bias source, the collector of transistor 10 could also be returned to the word line thereby keeping the total number of lines required to communicate with the cell to an absolute minimum.

Figure 5:
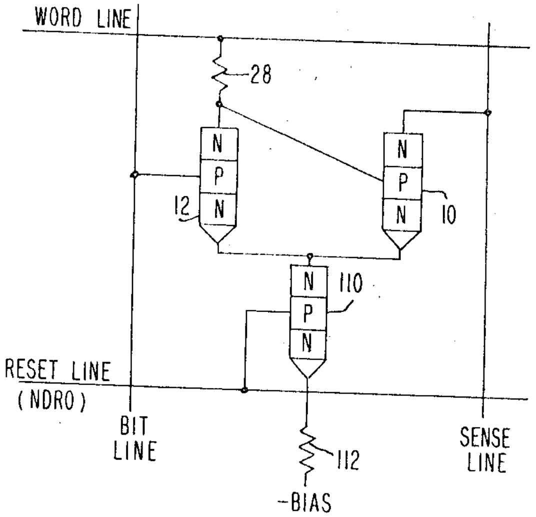
FIG. 5 is a schematic circuit diagram of still another embodiment of a memory element.

A further embodiment of the basic memory element or cell is illustrated in FIG. 5. The configuration of FIG. 5 is in almost all respects identical with the configuration of memory cell 1 in FIG. 3. However, superior cell operation can be achieved by controlling the emitter current with a constant source of current. Thus, in FIG. 5, transistors 10 and 12 have their emitters coupled together, but instead of a direct connection to a common resistor, an additional transistor 110 has its collector connected in common to the emitters of transistors 10 and 12, and the base of transistor 110 is connected to the reset line. The emitter of transistor 110 is connected to a source of negative bias through a resistor 112. As before with the memory cell of FIG. 3, the bit and sense lines are connected respectively to the base of transistor 12 and to the collector of transistor 10. The word line is connected as before to the collector of transistor 12 through resistor 28 and also to the base of transistor 10.

Several advantages are achieved with the configuration of FIG. 5. The constant current output characteristics of transistor 110 serve to provide better control in the operating points of transistors 10 and 12, allowing for wider margins on operating parameters. Furthermore, the reset line is more lightly loaded than the previous cell configuration and therefore more suited to be driven from low power circuits. With this configuration one can achieve lower power at the same minimum current or faster speed at the same maximum power.

Nondestructive read out operation in the configuration of FIG. 5 is achieved by placing a small negative or positive pulse on the reset line thereby causing a variation in the output current of transistor 110. This variation will occur on the sense line connected to transistor 10 only if transistor 10 is conducting.

Reset operation with the circuit of FIG. 5 is achieved when the reset line is returned to a potential close to the negative bias potential illustrated. This reduces the collector current of transistor 10 to close to zero. Reapplication of the original potential with consequent reapplication of current will cause transistor 10 to go into conduction (the zero state), thereby completing the reset operation.

Figure 6:
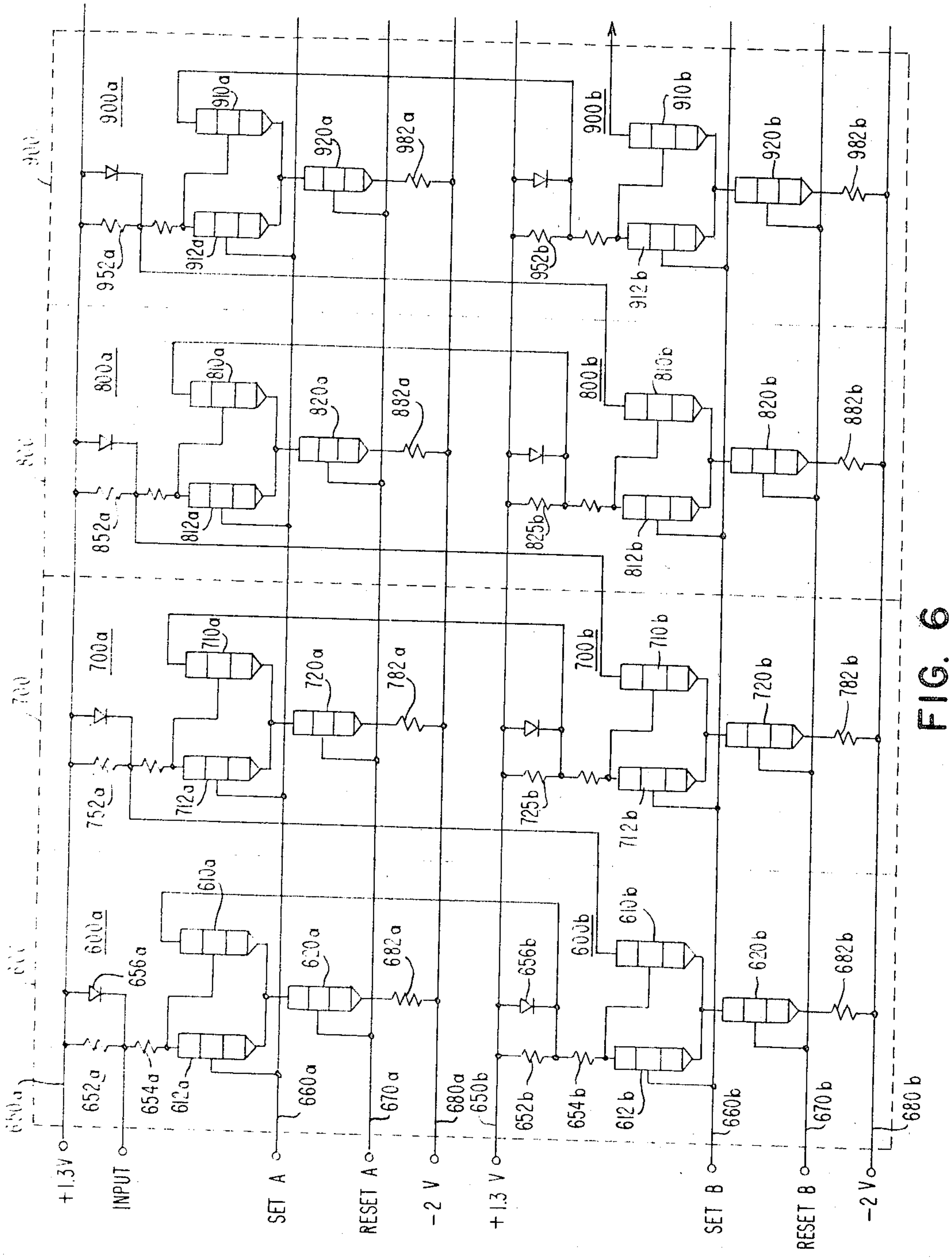
FIG. 6 is a schematic circuit diagram for a shift register in accordance with the present invention.

Referring now to FIG. 6, there is illustrated a shift register in accordance with the present invention. This shift register is typically shown as having a plurality of shift register stages 600, 700, 800 and 900, and each of these stages is divided into *a* and *b* sections. Thus, the stages comprise a double rank arrangement of shift cells. Each of the shift cells, for example shift cell 600*a*, corresponds essentially to the memory cell embodiment illustrated in FIG. 5, that is, to a three transistor cell where the third transistor serves as a constant source of current. Thus, in cell 600*a*, the transistors 610*a* and 612*a* correspond to transistors 10 and 12 of the cell shown in FIG. 5, and transistor 620*a* corresponds to transistor 110 in FIG. 5.

Although as a typical example the shift register of FIG. 6 is shown implemented by means of the particular memory cell of FIG. 5, it will be appreciated that the other embodiments of memory cells previously described may also be employed in the transistor shift register. All of the other individual cells illustrated in FIG. 6, that is cells 600*b*, 700*a*, 700*b*, 800*a*, 800*b*, 900*a* and 900*b* also conform essentially to the memory cell embodiment of FIG. 5.

In FIG. 6, the topmost line 650*a* is the fixed bias line for the cells in each of the top section of the shift register. Line 650*a* is connected to a fixed bias shown schematically and having a typical value of +1.3 volts. Line 650*a* is connected to each of the *a* cells by way of resistors 652*a*, 752*a*, 852*a*, 952*a*. An input source shown schematically is connected via resistors 654*a*, to the collector of transistor 612*a* and to the base of transistor 610*a*. The input source is connected only to the first cell in the array, that is, to the cell 600*a*.

Sources designated set A and Reset A are shown connected to lines 660*a* and 670*a* respectively, the line 660*a* being connected to each of the bases of transistors 612*a*, 712*a*, 812*a* and 912*a* in the *a* rank, and the 670*a* line being connected to the bases of the constant current source transistors 620*a*, 720*a*, 820*a* and 920*a*.

Another fixed bias shown schematically and having a value of approximately −2 volts is connected by means of line 680*a* to the emitters of transistors 620*a*, 720*a*, 820*a* and 920*a* via emitter resistors 682*a*, 782*a*, 882*a* and 982*a*.

The same essential scheme described above is used again in the second or *b* rank of the shift register, and corresponding parts have been labeled with the same numerals except that the letter *b* has been appended.

It will be noted that in the shift register the source labeled Input is connected only to the input of the cell 600*a*, and the inputs to the other cells follow in a cascade arrangement. Thus, the output from the cell 600*a* which is taken from the collector of the transistor 610*a*, is shown connected to the equivalent input point of cell 600*b*, that is, to the collector of transistor 612*b*, and to the base of transistor 610*b*. Likewise, the output from cell 600*b* is coupled from the collector of transistor 610*b* of that cell to the corresponding input point of cell 700*a*, that is, to the collector of the transistor 712*a* and to the base of transistor 710*a*. In similar fashion, connections are made from the other cells in the array with the final output point being indicated by the arrow on the line from the collector of transistor 910*b*.

It will be noted that in the circuit of FIG. 6, unidirectional coupling devices, such as the diodes 656*a* etc., have been used at the input to each cell for isolation purposes.

Figure 7:
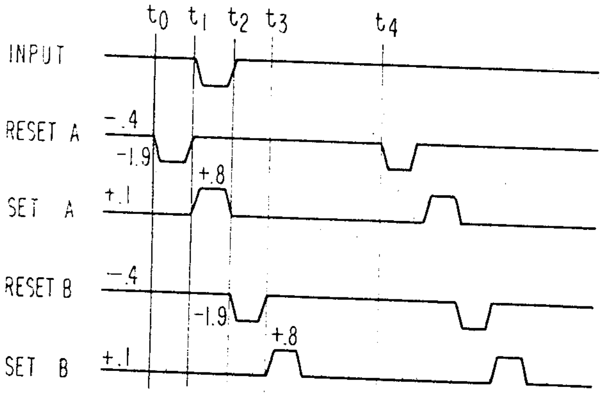
FIG. 7 is a schematic diagram of the wave forms of voltage versus time for explaning the operation of the circuit of FIG. 6.

Considering now the operation of the shift register of FIG. 6, reference may be had to the timing diagram of FIG. 7 which shows the pulse sequence required for operation. As noted previously, the input source labeled Input applies a pulse only to the first position of the shift register, that is, to cell 600*a*. The Reset A pulse source resets all positions in the *a* register such that the respective transistors 610*a*, 710*a*, 810*a* and 910*a* are conducting (zero state for each cell). The Set A pulse source sets each position in the *a* register to the state of the preceding *b* register position. The Reset B pulse source resets all positions in the *b* register such that the respective transistors 610*b*, 710*b*, 810*b* and 910*b* are conducting (zero state for each cell). The Set B pulse source sets each *b* register position to the state of the preceding *a* register position.

For simplicity, consider first of all only the operation of the cell 600*a*, recalling that after such a cell has been reset, transistor 610*a* is left in conduction. Transistor 620*a* serves only to provide a constant current source to the transistors 610*a* and 612*a*. Now, if a negative going input as shown in FIG. 7 is applied to cell 600*a*, this serves to lower the base potential of transistor 610*a* to the point where application of a positive pulse to the base of transistor 612*a* will cause the latter to go into conduction. Such a positive pulse is provided by the Set A source. However, if transistor 610*a* of cell 600*a* is conducting, it, in turn, applies a negative going potential to the collector of transistor 612*b* in cell 600*b* and will cause transistor 612*b* to go into conduction upon application of a Set B pulse.

Now assume that the aforesaid negative going input is applied at the time $t_1$ to the cell 600*a* and that, coincidently, a positive going pulse is applied from the Set A source, then the transistor 612*a* will become conductive, this being the "1" state. This "1"state is propagated to the cell 700*a* in the following manner. Since the transistor 610*a* is now nonconductive, when a Set B pulse is applied at time $t_3$ to cell 600*b*, the transistor 610*b* remains in conduction (zero state). The Reset A pulse applied at time $t_4$ now resets all positions of the *a* register to the zero state. Thus, transistors 610*a*, 710*a*, 810*a* and 910*a* are conducting. After the application of this reset pulse the current from transistor 610*b* of cell 600*b* causes the base of transistor 710*a* of cell 700*a* to be at a potential such that the application of a Set A pulse causes cell 700*a* to go into its "1" state with transistor 712*a* conductive. This completes the operation required to propagate a "1" from cell 600*a* to cell 700*a*. It will be evident that simultaneously with the transfer from cell 600*b* to cell 700*a*, a new bit can be entered into cell 600*a*, and this turn can be transferred to cell 700*a*.

The aforenoted reset operation (Reset A or B) is accomplished by applying a negative going potential to the base of the appropriate constant-current-source transistor, such as transistor 620*a*, which serves to reduce to zero the current available to the emitters of each of the cross-coupled transistors, such as transistors 610*a* and 612*a* in cell 600*a*.

What has been described is a unique transistor memory element or cell which may be arranged in a number of circuit configurations and which may be combined with like cells in arrays such as matrices to perform the functions of an entire memory system. Additionally, a transistor shift register has been described which exploits the capabilities of the aforesaid memory element or cell to provide a direct coupled double-rank register that is readily implemented in monolithic form without the use of reactive elements.

While there have been shown and described and pointed out the fundamental novel features of the invention as applied to the preferred embodiments, it will be understood that various omissions and substitutions and changes in the form and details of the apparatus illustrated and in its operation may be made by those skilled in the art without departing from the spirit of the invention. It is the intention, therefore, to be limited only as indicated by the scope of the following claims.

What is claimed is:

1. A memory system comprising a plurality of memory cells, each memory cell comprising a pair of three terminal solid state devices, a first terminal of only one of said devices being directly connected to a second terminal of the other device, a load impedance connected to the first terminal of said one of said devices, and a common impedance connected to the third terminal of both of said devices, each memory cell having two quiescent states, a first state in which said one of said devices is conductive and the other is nonconductive, and a second state in which the other is conductive and said one is nonconductive, said first state defining the storage of a "1" by said cell and the second state defining the storage of a "0,"

at least three lines connected to each of the memory cells, a first of said lines being connected through said load impedance to the first terminal of each said one of said devices in each of the memory cells corresponding to bit positions in a predetermined data word, a second bit line being connected to the second terminal of each said one of said devices in each of the memory cells corresponding to the same bit position in different data words, a third line being connected to the common impedances in each of the memory cells corresponding to the different bit positions in a data word, means for applying pulses coincidently to said first and second lines, the direction of said pulses being opposed and the direction thereof on said second line corresponding with the polarity of said one of said devices, whereby a "1" is written into a predetermined cell.

2. A memory system as defined in claim 1, further including means for resetting a cell to its zero state, said means being connected to said third line, said means including a pulse source for providing a pulse of sufficient magnitude to shut off current to both of said devices initially and to cause said other device to be conductive when said pulse is removed.

3. A memory system as defined in claim 1, further including means for reading out a cell nondestructively, said means including a pulse source for providing a pulse insufficient in magnitude to change the state of said cell but sufficient to cause a variation of current flow in one of said devices in said cell.

4. A memory system as defined in claim 3, wherein said means for nondestructively reading out a cell is connected to said third line.

5. A memory system as defined in claim 3, wherein said means for nondestructively reading out a cell is connected to said first line.

6. A memory system as defined in claim 3, further including a fourth line connected to the collectors of each of said other devices in each of the memory cells corresponding to the same bit position in different data words, and sense means connected to said fourth line for detecting a variation in current flow at the collectors of any of said other devices.

7. A memory system comprising a plurality of memory cells in a matrix, each memory cell comprising a pair of transistors, the collector of only one of said transistors being directly connected to the base of the other transistor, a load impedance connected to the collector of said one of said transistors, and a common impedance connected to the emitters of both of said transistors, each memory cell having two quiescent states, a first state in which said one of said transistors is conductive and the other is nonconductive, and a second state in which the other is conductive and said one is nonconductive, said first state defining the storage of a "1" by said cell and the second state defining the storage of a "0,"

at least three lines connected to each of the memory cells in the memory system, a first of said lines being connected through said load impedance to the collector of each said one of said transistors in each of the memory cells corresponding to the different bit positions in a predetermined data word, a second line connected to each of the bases of each of the other transistors of the memory cells corresponding to the same bit position in different data words, a third line being connected to the common impedances in each of the memory cells corresponding to the different bit positions in a data word, means for applying coincidently pulses to said first and second lines, the direction of said pulses being opposed and the direction thereof on said second line corresponding with the polarity of said one of said transistors, whereby a "1" is written into a predetermined cell.

8. A memory system as defined in claim 7, wherein said transistors are of N-P-N type, and wherein the pulse applied to the second line is positive-going.

9. A memory system as defined in claim 8, further including means for resetting the cell to one of its quiescent states, said means being connected to said third line and thereby to the common impedance of each of said memory cells, said means proving a pulse of sufficient magnitude to shut off current to both of said transistors initially and to cause said other transistor to be conductive.

10. A memory system as defined in claim 8, further including means for reading out cells nondestructively, said means including a pulse source for providing a pulse insufficient in magnitude to reset said cell but sufficient to cause a variation in current flow in said cell.

11. A memory system as defined in claim 10, wherein said means for nondestructively reading out said cells is connected to said third line.

12. A memory system as defined in claim 10, wherein said means for nondestructively reading out said cells is connected to said first line.

13. A transistor shift register comprising a plurality of stages, each stage having first and second sections and each section including a transistor memory cell, each transistor memory cell comprising at least two transistors, the first transistor having its collector directly connected to the base of the second transistor, a load impedance connected to the collector of said first transistor, a common impedance connected to the emitters of both of said transistors, at least two lines connected to all the memory cells in said first sections in said plurality of stages, one of said at least two lines being connected to the bases of all of said first transistors in said first sections; and at least two other lines connected to all the memory cells in said second sections in said plurality of stages, one of said at least two other lines being connected to the bases of all of said first transistors in said second sections, means for directly connecting the output of the first section of each stage to the second section thereof, and means for directly connecting the output of the second section of each stage to the first section of the next succeeding stage, an input source connected to the input of the first section of the first stage, means for storing bits of information in said shift register and for shifting said bits of information from one stage to the next succeeding stage comprising pulse means connected to each of said at least two lines and to each of said at least two other lines.

References Cited

UNITED STATES PATENTS

| | | | |
|---|---|---|---|
| 3,067,339 | 12/1962 | Poppelbaum | 307—290 X |
| 3,218,613 | 11/1965 | Gribble et al. | 340—173 |
| 3,295,031 | 12/1966 | Schmitz | 307—289 X |
| 3,297,950 | 1/1967 | Lee | 307—221 X |
| 3,364,362 | 1/1968 | Mellott | 340—173 X |

BERNARD KONICK, *Primary Examiner.*

J. F. BREIMAYER, *Assistant Examiner.*

U.S. Cl. X.R.

307—221, 238, 290

PO-1050
(5/69)

UNITED STATES PATENT OFFICE
CERTIFICATE OF CORRECTION

Patent No. 3,449,728 Dated June 10, 1969

Inventor(s) Robert A. Henle and Wilbur D. Pricer

It is certified that error appears in the above-identified patent and that said Letters Patent are hereby corrected as shown below:

In the specification, column 2, line 8, "stage" should be -- storage --.

column 3, line 31 - "explaning" should be -- explaining --.

Claim 8, line 3, before "second" insert -- first line is negative-going and the pulse applied to the --.

SIGNED AND
SEALED
MAR 3 - 1970

(SEAL)
Attest:

Edward M. Fletcher, Jr.
Attesting Officer

WILLIAM E. SCHUYLER, J
Commissioner of Patent

PO-1050
(5/69)

UNITED STATES PATENT OFFICE
CERTIFICATE OF CORRECTION

Patent No. 3,449,728 Dated June 10, 1969

Inventor(s) Robert A. Henle and Wilbur D. Pricer

It is certified that error appears in the above-identified patent and that said Letters Patent are hereby corrected as shown below:

Claim 7, column 9, lines 25 and 26, delete "of the other transistors" and insert -- said one of said transistors in each --.

SIGNED AND SEALED
SEP 15 1970

(SEAL)
Attest:

Edward M. Fletcher, Jr.
Attesting Officer

WILLIAM E. SCHUYLER, JR.
Commissioner of Patents